United States Patent [19]

Bach et al.

[11] Patent Number: 4,718,737
[45] Date of Patent: Jan. 12, 1988

[54] POWER BRAKING SYSTEM WITH REDUCED PEDAL TRAVEL

[75] Inventors: Lloyd G. Bach, South Bend; James M. Sypniewski, Granger, both of Ind.

[73] Assignee: Allied Corporation, Morristown, N.J.

[21] Appl. No.: 899,857

[22] Filed: Aug. 25, 1986

[51] Int. Cl.⁴ .............................................. B60T 8/44
[52] U.S. Cl. ...................................... 303/114; 303/93; 303/119
[58] Field of Search ............. 60/545, 547.1, 548, 60/553; 188/181 A; 303/92, 93, 101, 114, 115, 119

[56] References Cited

U.S. PATENT DOCUMENTS

| | | | |
|---|---|---|---|
| 3,761,140 | 9/1973 | Lewis et al. | 303/114 |
| 3,827,763 | 8/1974 | Kobashi et al. | 303/114 |
| 4,568,130 | 2/1986 | Leiber | 303/114 X |
| 4,589,706 | 5/1986 | Leiber | 303/114 X |
| 4,620,750 | 11/1986 | Leiber | 303/114 |

*Primary Examiner*—Duane A. Reger
*Attorney, Agent, or Firm*—Ken C. Decker

[57] ABSTRACT

The invention is an improved anti-lock braking system in which the conventional brake switch operable in response to movement of the brake pedal is utilized by the electronic control of the anti-lock brake system to generate a control signal. The isolation and build valves of one hydraulic circuit are energized in response to the control signal to connect a wheel cylinder to the booster of the braking system.

5 Claims, 1 Drawing Figure

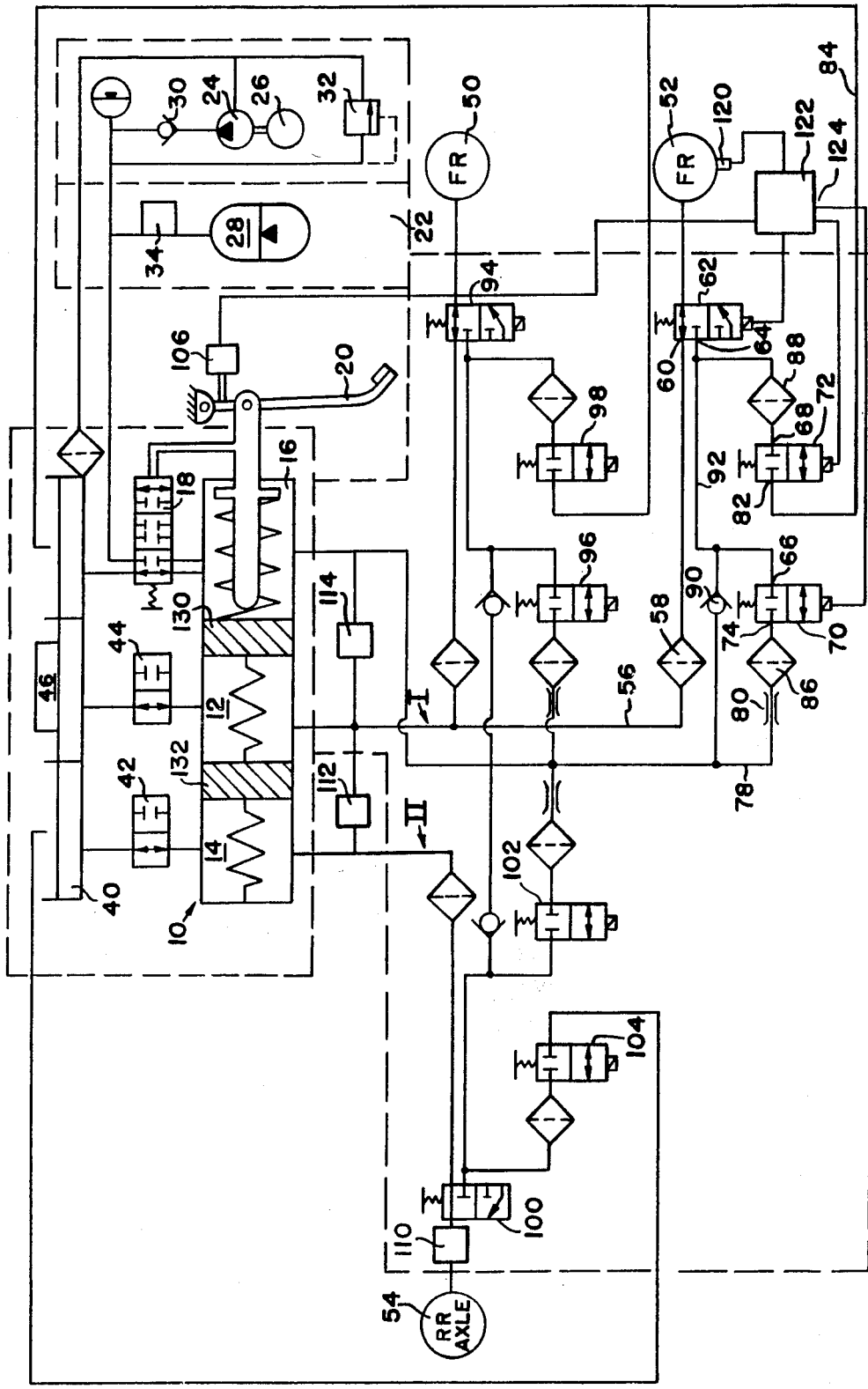

POWER BRAKING SYSTEM WITH REDUCED PEDAL TRAVEL

BACKGROUND OF THE INVENTION

The present invention relates to devices for reducing the pedal travel required to apply the brakes in a powered braking system and in particular to a device which utilizes a hydraulic booster and modulating valves associated with an antilock braking system to reduce the pedal travel required during normal braking.

The brakes of a vehicle are primarily a pressure responsive device in contrast to, for example, an accelerator which is a motion responsive device. Various mechanical characteristics of a braking system such as volume and movement of wheel cylinders required to bring the brake shoes into contact with a drum or rotor, expansion of flexible brake lines and movement between the open and closed positions of the piston of a master cylinder relative to a fill orifice, inherently cause some amount of pedal movement before braking pressure builds. This characteristic will be further increased in dual or split braking systems. Conversely, experience has shown that drivers prefer to have some degree of movement of the brake pedal during use so that the brakes will exhibit a desirable degree of "feel". Heretofore, various devices have been proposed to provide a means to produce a braking system that does not exhibit excessive pedal movement and which simultaneously provides a desired degree of feel.

Simultaneously, anti-lock or adaptive braking systems have now been developed, such systems incorporating sensors, a computing circuit, and a plurality of modulating valves for automatically controlling the application of braking pressure in response to an incipient skid condition of a vehicle's wheels. Such systems typically incorporate a power booster in the form of a motor driven pump and an accumulator to provide power boost during normal braking operation and to provide a source of pressurized fluid during adaptive braking operation.

Broadly, the present invention utilizes existing adaptive braking hardward including the pump-accumulator, brake switch, hydraulic booster, and modulating valves in cooperation with the adaptive braking control to provide a braking system having reduced brake pedal travel during normal non-adaptive braking operation. In a specific embodiment of the invention, actuation of the conventional brake switch provides an input signal to the adaptive braking control. The control, in response to the signal, actuates the isolation valves of one of the hydraulic circuits of the adaptive braking system and the build valves of that hydraulic circuit to connect same to the hydraulic booster. The hydraulic circuit, thus actuated, operates as a full power hydraulic circuit. Because of the volumetric capacity of the pump and accumulator, the additional displacement required to bring the activated hydraulic circuit to the pressure operating portion of its operation is satisfied by the pump and accumulator. This eliminates movement of the brake pedal required to bring the activated hydraulic circuit to its pressure operating state. Because the system operates upon actuation of the brake switch, adjustment of the brake switch operating point can be utilized to provide any desired movement and corresponding degree of feel for the braking system without the need for any physical modification of brake components and without the need for any physical modification of brake components such as spring rates, piston diameters and the like.

It is therefore an object of the invention to provide an improved braking system having reduced pedal travel.

Another object of the invention is to provide such a system which utilizes existing anti-lock braking system hardware to reduce brake pedal travel during normal braking operation.

Still another object of the invention is to provide such a system which utilizes a brake switch in conjunction with anti-lock braking components to provide a system exhibiting reduced brake pedal travel.

Another object of the invention is to provide a braking system in which the pump, accumulator, hydraulic booster, isolation and build valves, and electronic control unit of an anti-lock braking system are utilized to operate at least one hydraulic circuit of the braking system as a full power braking system during normal braking operation.

Still another object of the invention is to provide such a system in which the pedal feel can be controlled by adjustment of a standard brake switch.

BRIEF DESCRIPTION OF THE DRAWINGS

These and other objects of the invention and the invention itself will be best understood in view of the following specification taken in conjunction with the appended drawing which shows an anti-lock braking system incorporating the present invention shown in schematic format.

DESCRIPTION OF THE PREFERRED EMBODIMENT

Referring now to the drawing, there is shown schematically a braking system provided with an anti-lock or adaptive braking control system. The braking system includes a dual piston displacement-type master cylinder 10 having a primary and a secondary hydraulic cylinder 12, 14, respectively, actuated by pressurized fluid in a booster cylinder 16. The booster cylinder, in turn, receives pressurized fluid the pressure of which is modulated by means of a control valve 18. Valve 18 is controlled by a manually operable brake pedal 20. Pressurized fluid is supplied from a pump and an accumulator assembly 22 which includes a hydraulic pump 24 driven by a motor 26, an accumulator 28, and associated check valve 30, return valve 32, and a low pressure switch 34. Fluid for the system is carried in a multiple chamber reservoir 40 there being a chamber for each of the primary and secondary cylinders 12, 14, and the booster cylinder 16. Fluid passes from the reservoir 40 to the respective chambers via stop valves 42, 44 or fill orifices and the control valve 18. A fluid level switch 46 is operatively coupled to the reservoir to provide an indication of the presence or absence of sufficient fluid for operation of the system.

As illustrated, the braking system includes two braking circuits I and II. During normal braking, the hydraulic circuits I, II are fully isolated with circuit I providing pressurized brake fluid for the front wheels 50, 52 of a vehicle and circuit II providing pressurized fluid for operation of the wheels of the rear axle 54.

A primary hydraulic line 56 exits the primary cylinder 12. This line passes through a filter 58 and through the normally open port 60 of a three-way isolation valve 62 to wheel cylinder 52. Connected to the normally closed port 64 of valve 62 are the normally closed ports 66, 68 of a build valve 70 and a decay valve 72. The inlet port 74 of build valve 70 is connected via a fluid line 78 and a flow control orifice 80 to the outlet of the booster cylinder 16. The outlet port 82 of decay valve 72 is connected via hydraulic line 84 to the reservoir 40. Appropriate filters 86, 88 are also provided and a check valve 90 is connected hydraulically in parallel with build valve 70 to bleed any trapped pressure in hydraulic line 92 when the build valve 70 is closed and the pressure in the primary cylinder 12 is less than pressure in the line 92.

An isolation build, and decay valve array including valves 94, 96 and 98 are identically connected to the other front wheel cylinder 50 and array 100, 102 and 104 to rear axle cylinders 54, these arrays being otherwise identical to that described in conjunction with wheel cylinder 52.

A brake switch 106 is operatively coupled to the brake pedal 20, switch 106 being adjustable to operate in response to predetermined amount of movement of the brake pedal 20. A front-rear proportioning valve 110, and differential pressure switches 112, 114 are connected between the primary and secondary cylinders 12, 14, and between primary cylinder 12 and booster 16, respectively, the operation of these switches in conjunction with the anti-lock braking system being more fully described in copending United States patent application Ser. No. 875,037 filed June 17, 1986 and commonly assigned to the assignee of this invention.

Associated with the wheel 52, is a wheel speed sensor 120 which feeds data relevant to the rotational behavior of the wheel to an electronic control unit 122. Similarly, outputs from the fluid level switch 46, low pressure switch 34 and differential pressure switches 112, 114 are connected to and provide relevant data of braking system operation to the control 122. The control 122, in response to this data, generates control signals at output terminals 124 to effect control of the isolation, build and decay valves such as valves 62, 70 and 72. Connections are shown only to these latter valves. However, the remaining isolation, build, and decay valves are identically connected and respond to the control signals from the control 122 to operate the valves and thereby effect control of braking pressure to the wheels 50, 52 and rear axle 54 of the vehicle.

During normal braking operation, depression of the brake pedal 20 operates the control valve 18 to apply pressurized braking fluid from the pump and accumulator 24, 28 to the boost chamber 16. This pressure, in turn, operates against primary piston 130 to apply pressure through isolation valves 94, 62 to the wheel cylinders 50, 52, respectively. Pressure in the primary chamber 12 produces movement of piston 132 applying braking pressure through hydraulic circuit II and isolation valve 100, to the rear wheel cylinders 54. In the event that an incipient skid condition is sensed via sensors at 120, the control system 122 energizes the appropriate isolation valve such as valve 62. Brake pressure to the associated wheel cylinder 52 is then controlled by applying or releasing brake pressure from the wheel cylinder through the isolation valve 62 or decayed to reservoir 40 through decay valve 72, pressurized fluid being supplied directly from the boost cylinder 16.

Under normal braking, it will be recognized that brake pressure in the wheel cylinders 50, 52, and 54 does not occur until mechanical play and resilience in the brake system has first been accommodated. This, in turn, requires a predetermined minimum movement of the brake pedal. This operational distance is further increased by the distance that must be traversed by the pistons 130, 132 to close the normal bleed or fill orifices 44, 42 communicating between the reservoir 40 and the respective chambers 12, 14.

In accordance with the present invention, the brake switch 106 is connected directly to the anti-lock control 122. The brake switch can be adjusted, typically by physical adjustment of a lock not assembly, to operate in response to any predetermined amount of movement of the brake pedal 20. The operation of the switch 106 is utilized by the control 122 to energize the isolation valves of one of the braking circuits I, II. Simultaneously, the control will, under these circumstances, (normal braking, operation of brake switch 106, and anti-lock braking not controlling) energize the build valves associated with hydraulic circuit I, or II. This places the wheel cylinders of the circuit in direct communication with the boost chamber 16. This portion of the braking system will now operate as a full power hydraulically boosted braking system. The hydraulic cylinder 12 or 14 associated with this hydraulic circuit thus becomes less effective and any lag in the circuit is accommodated by the pressure and fluid from the boost chamber 16. This will remove the mechanical movement in the brake pedal 20 that would normally occur during normal braking to accommodate for play, resilience and the like of the hydraulic circuit isolated. Accordingly, it will be seen that the system of the present invention can substantially reduce the amount of pedal movement required and that this movement can be directly adjusted to provide a desired amount of "feel" by simple adjustment of the brake switch operation point.

In the event of a failure of the boost for any reason, the system will, under control of the controller 122 operate as a conventional dual cylinder manual displacement type braking system without any loss in this important safety feature.

Furthermore, it is contemplated that one skilled in the art could make modifications and/or changes to the invention as described herein without deviation from the essense thereof. As such these modifications and/or changes are intended to fall within the scope of the appended claims.

What we claim is:

1. In an anti-lock braking system which includes a master cylinder having a hydraulic booster connected to a source of pressurized braking fluid, at least one hydraulic circuit including a wheel cylinder connected to said master cylinder and operable to brake the wheels of a vehicle, anti-lock braking means including means for sensing the rotational behavior of said wheel and a computing circuit for generating control signals, valve means connected to said control circuit and responsive to said control signals for controlling braking of said wheels in response to an incipient lock condition, the improvement comprising: a brake switch operable in response to a predetermined movement of a manually operated brake pedal, said computing circuit being connected to said switch and being responsive thereto to generate a control signal, said valve means including at least one isolation valve and a build valve, said isolation valve and said build valve being operable in response to said control signal to isolate said wheel cylinder from said master cylinder and to connect same to said booster.

2. The braking system of claim 1 wherein there are two said hydraulic circuits, there being valve means for each said hydraulic circuit, the isolation and build valves of one circuit being operable in response to said control signal, the valve means of the other of said hydraulic circuits being non-responsive thereto.

3. The system of claim 2 wherein said brake switch is a mechanically operated switch operatively coupled to the brake pedal of said braking system, said brake switch being selectively adjustable to operate in response to said predetermined movement of said brake pedal.

4. The system of claim 3 wherein said master cylinder is a displacement type master cylinder including a primary and a secondary piston hydrostatically operable in response to fluid pressure in said booster.

5. The system of claim 4 wherein there are a plurality of said isolation valves and a plurality of said build valves in each said hydraulic circuits, the said plurality of isolation valves and plurality of build valves of one said circuit being operable in response to said control signal.

* * * * *